United States Patent
Young

(10) Patent No.: US 6,354,972 B1
(45) Date of Patent: Mar. 12, 2002

(54) CHAIN TENSIONER ASSEMBLY HAVING A SINGLE-FASTENER MOUNTING ARRANGEMENT

(75) Inventor: James D. Young, Chesaning, MI (US)

(73) Assignee: Cloyes Gear and Products, Inc., Mentor, OH (US)

( * ) Notice: Subject to any disclaimer, the term of this patent is extended or adjusted under 35 U.S.C. 154(b) by 0 days.

(21) Appl. No.: 09/471,783

(22) Filed: Dec. 23, 1999

Related U.S. Application Data

(60) Provisional application No. 60/113,689, filed on Dec. 24, 1998.

(51) Int. Cl.[7] .............................. F16H 7/08; F16H 7/22
(52) U.S. Cl. ........................ 474/101; 474/111; 474/140
(58) Field of Search ................................ 474/111, 101, 474/140, 110

(56) References Cited

U.S. PATENT DOCUMENTS

| | | | |
|---|---|---|---|
| 4,395,250 A | * | 7/1983 | King ........................... 474/111 |
| 4,921,472 A | | 5/1990 | Young ......................... 474/111 |
| 5,286,234 A | | 2/1994 | Young ......................... 474/111 |
| 5,425,680 A | | 6/1995 | Young ......................... 474/111 |
| 5,711,732 A | | 1/1998 | Ferenc et al. ................ 474/111 |
| 5,730,674 A | * | 3/1998 | Ott .............................. 474/111 |
| 5,776,024 A | * | 7/1998 | White et al. ................. 474/110 |

* cited by examiner

Primary Examiner—Richard M. Lorence
Assistant Examiner—Tisha O. Lewis
(74) Attorney, Agent, or Firm—Fay, Sharpe, Fagan, Minnich & McKee, LLP

(57) ABSTRACT

A chain tensioner apparatus and a method for mounting the chain tensioner apparatus to an engine component is disclosed. The chain tensioner apparatus includes a bracket having a first surface and a second surface, and a pivot pin secured to the bracket. The pivot pin includes a first portion extending from the first surface and a second portion extending from the second surface. A shoe sub-assembly is pivotally mounted to the pivot pin first portion. The method includes the steps of inserting the pivot pin second portion into a bore associated with the engine component, and securing the bracket to the engine component with a fastener.

14 Claims, 7 Drawing Sheets

CHAIN TENSIONER ASSEMBLY HAVING A SINGLE-FASTENER MOUNTING ARRANGEMENT

CROSS REFERENCE TO RELATED APPLICATION

This application claims the benefit of U.S. Provisional Patent Application Ser. No. 60/113,689, filed Dec. 24, 1998.

BACKGROUND OF THE INVENTION

The present invention relates to the chain tensioner arts. The preferred embodiment of the invention finds particular application in conjunction with a timing chain drive for an automotive engine, and will be described with reference thereto. However, the present invention can also find application with other types of chain drive systems, and in applications other than automotive engines.

With reference to FIG. 1, a conventional chain drive system 10, of the type often used on internal combustion automobile engines for timing purposes, rotates in a clockwise direction as shown by arrow 11. The chain drive system 10 includes at least a drive sprocket 12, a driven sprocket 14, and a chain 16 (e.g. roller chain, inverted tooth chain, etc.) having a number of chain pitches 18. As known in the art, the chain drive system 10 can include additional sprockets such as idler sprockets, balance shaft sprockets, etc. The chain 16 engages and wraps about sprockets 12 and 14 and has two spans extending between the sprockets, slack strand 20 and taut strand 22. A central portion of the taut strand 22 may be guided between the driven sprocket 14 and the drive sprocket 12 with a conventional chain guide (not shown). The taut strand 22 of chain 16 is under tension as s shown by arrow 26.

A conventional blade-type mechanical tensioner assembly 24 applies a tensioning force to the slack strand 20. The tensioner assembly 24 includes a bracket 28, typically formed by stamping as a rigid metal bracket, and an elongated shoe sub-assembly 30 pivotally secured to the bracket 28 by a pivot pin 32. The sub-assembly 30 includes a chain-engaging shoe member 34, typically injection molded from a plastic resin material that will "creep" under load and elevated temperature, and a blade spring 36, typically formed from spring steel, incorporated into the shoe member to provide the shoe sub-assembly 30 with the resiliency and rigidity that is necessary to apply the proper amount of tensioning force to the slack strand 20 of chain 16.

As best shown in FIGS. 2a and 2b, the pivot pin 32 includes a flanged portion 32A having a cylindrical portion 32B. The bracket 28 includes an aperture 33 that is shaped to mutually conform to and receive the cylindrical portion 32B. The pivot pin 32 can be affixed to the bracket 28 in any conventional manner such as by resistance welding, press-fitting, swaging, etc. The pivot pin 32 provides a reaction support and pivoting means for the shoe sub-assembly 30, thus permitting the tensioner to function properly in a firing engine. The pin 32, as illustrated in FIGS. 2b and 2c, does not extend beyond an engine mounting surface 38 of the bracket. However, at least two fasteners 40A, 40B (FIG. 1) extend past the engine mounting surface 38 to secure the bracket 28 to an engine case or block in order to properly orient the chain-engaging shoe member 34 with respect to the slack strand 20 of the chain 16.

With many engine designs, the above-described tensioner assembly 24 must be installed within a confined space, thus making it difficult to utilize multiple fasteners to secure the tensioner assembly to the engine. Accordingly, it is considered desirable to provide a new and improved chain tensioner assembly, that meets the above-stated needs and overcomes the foregoing difficulties and others while providing better and more advantageous results.

SUMMARY OF THE INVENTION

In accordance with one aspect of the present invention, a chain tensioner assembly is provided. The chain tensioner assembly includes a bracket having a first surface and a second surface, and a pivot pin secured to the bracket. The pivot pin includes a first portion extending from the first surface and a second portion extending from the second surface. A shoe sub-assembly is pivotally mounted to the pivot pin first portion. The pivot pin second portion is adapted to extend into a bore of an associated engine component in a mounted state of the chain tensioner assembly.

In accordance with another aspect of the present invention, a chain drive system is provided. The chain drive system includes a first sprocket, a second sprocket, a chain adapted to engage the first sprocket and the second sprocket, and a chain tensioner assembly adapted to impart a tensioning force on the chain. The chain tensioner assembly includes a bracket having a first surface and a second surface, and a pivot pin secured to the bracket. The pivot pin includes a first portion extending from the first surface and a second portion extending from the second surface. A shoe subassembly is pivotally mounted to the pivot pin first portion. The pivot pin second portion is adapted to extend into a bore of an associated engine component in a mounted state of the chain tensioner assembly.

In accordance with a further aspect of the present invention, a chain drive system associated with an automobile engine is provided. The chain drive system includes a drive sprocket rotatably mounted to the engine, a driven sprocket rotatably mounted to the engine, a chain engaging the drive sprocket and the driven sprocket, and a chain tensioner assembly that imparts a tensioning force on the chain. The chain tensioner assembly includes a bracket having a first surface and a second surface, and a pivot pin secured to the bracket. The pivot pin includes a first portion extending from the first surface and a second portion extending from the second surface. A shoe sub-assembly is pivotally mounted to the pivot pin first portion. The pivot pin second portion extends into a bore associated with the engine.

In accordance with yet another aspect of the present invention, a method of mounting a chain tensioner assembly to an engine component is disclosed. The chain tensioner assembly includes a bracket having a first surface and a second surface, and a pivot pin secured to the bracket. The pivot pin includes a first portion extending from the first surface and a second portion extending from the second surface. A shoe sub-assembly is pivotally mounted to the pivot pin first portion. The method includes the steps of inserting the pivot pin second portion into a bore associated with the engine component, and securing the bracket to the engine component with a fastener.

One advantage of the present invention is the provision of a chain tensioner assembly that will package in a confined space where two or more fasteners cannot be easily utilized.

Another advantage of the present invention is the provision of a chain tensioner assembly that can be easily and rapidly secured to an engine component such as an engine block during an assembly procedure.

Yet another advantage of the present invention is the provision of a method for mounting a chain tensioner assembly within a confined space associated with an automotive engine component such as an engine block, where it is difficult to utilize a plurality of conventional fasteners to attach the chain tensioner assembly to the engine component.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

DETAILED DESCRIPTION OF THE PREFERRED EMBODIMENT

Figure 1:
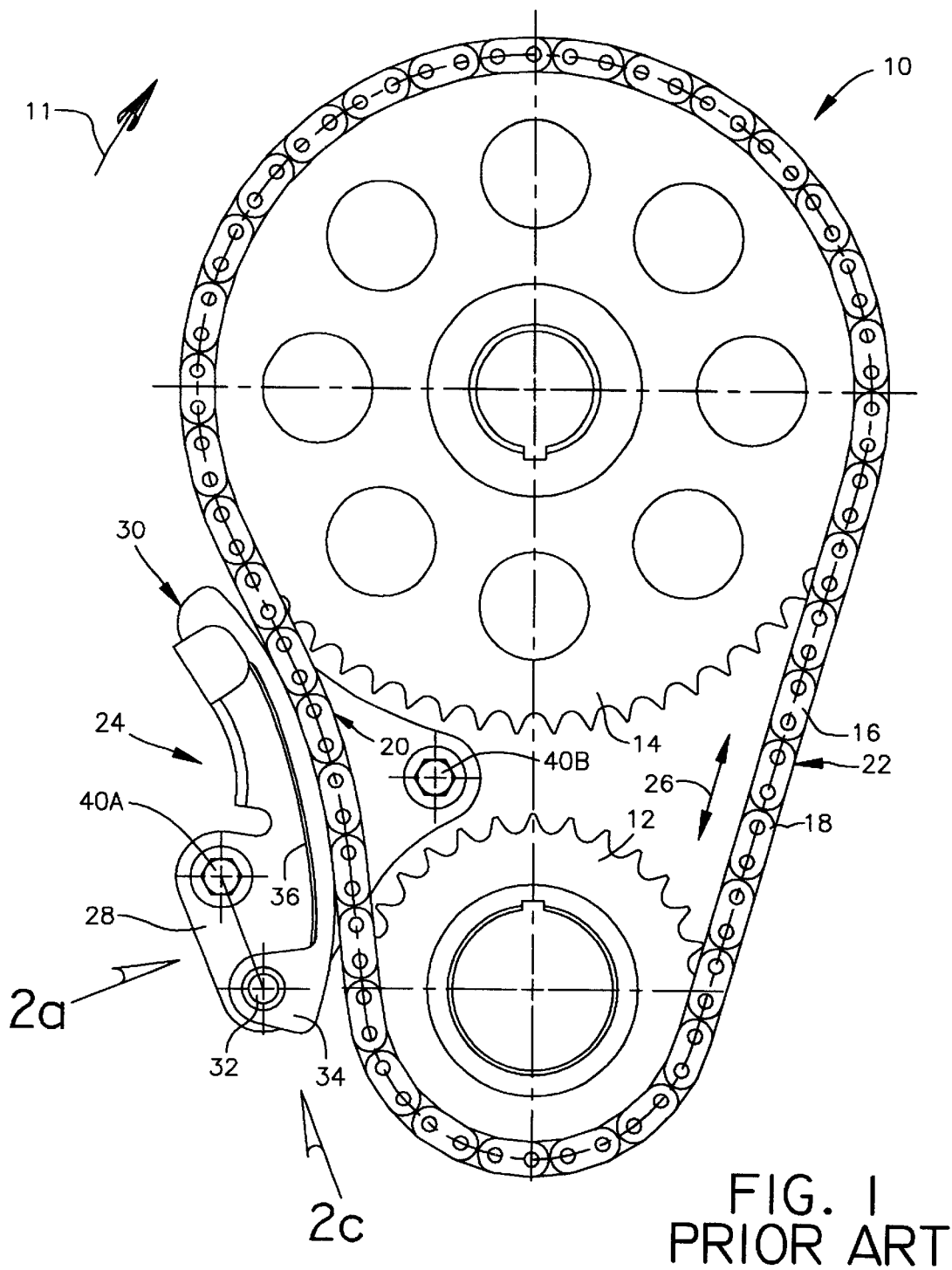
FIG. 1 illustrates an exemplary automotive chain drive installation having a conventional mechanical tensioner assembly.
Figure 2A:
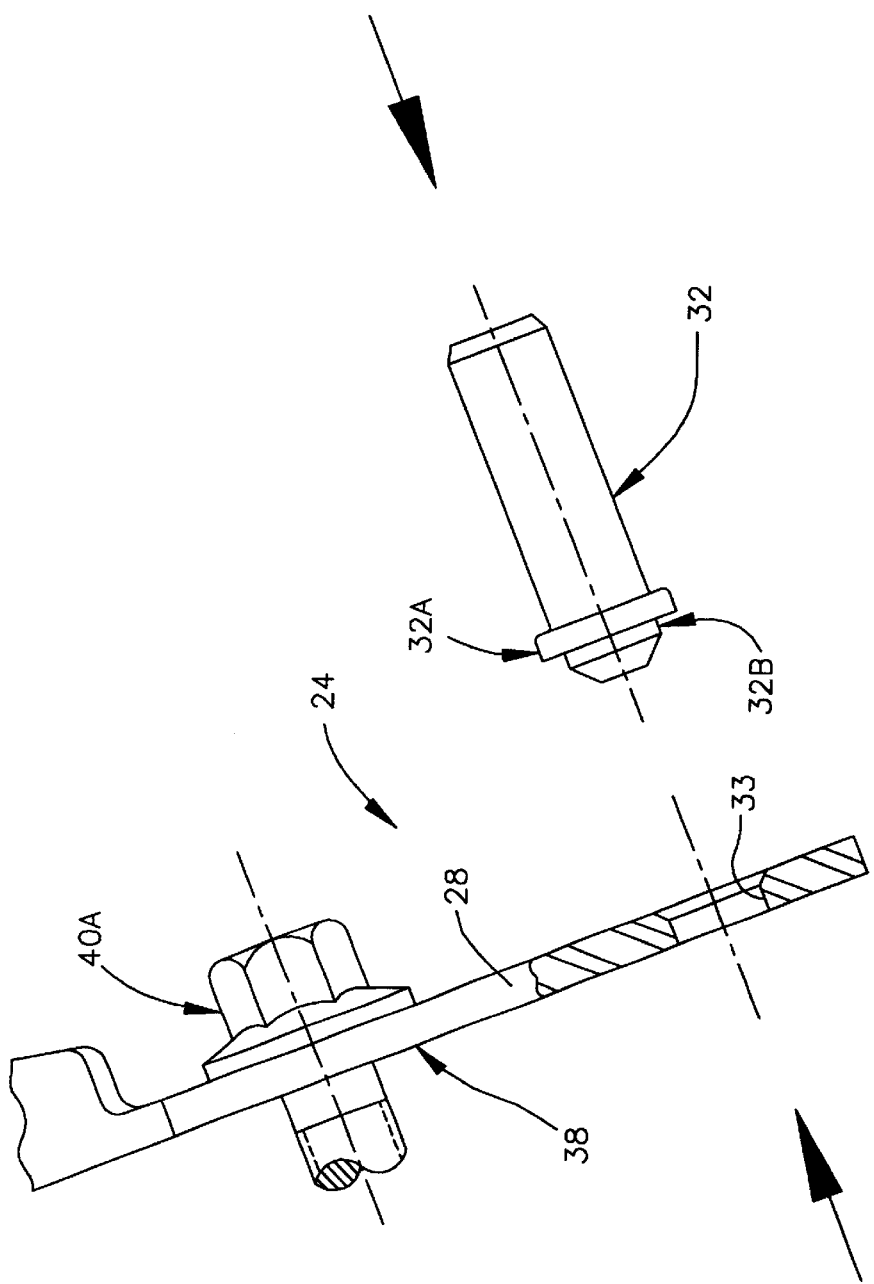
FIG. 2a is an exploded, partial sectional, view of the tensioner assembly taken along arrow 2a of FIG. 1.
Figure 2B:
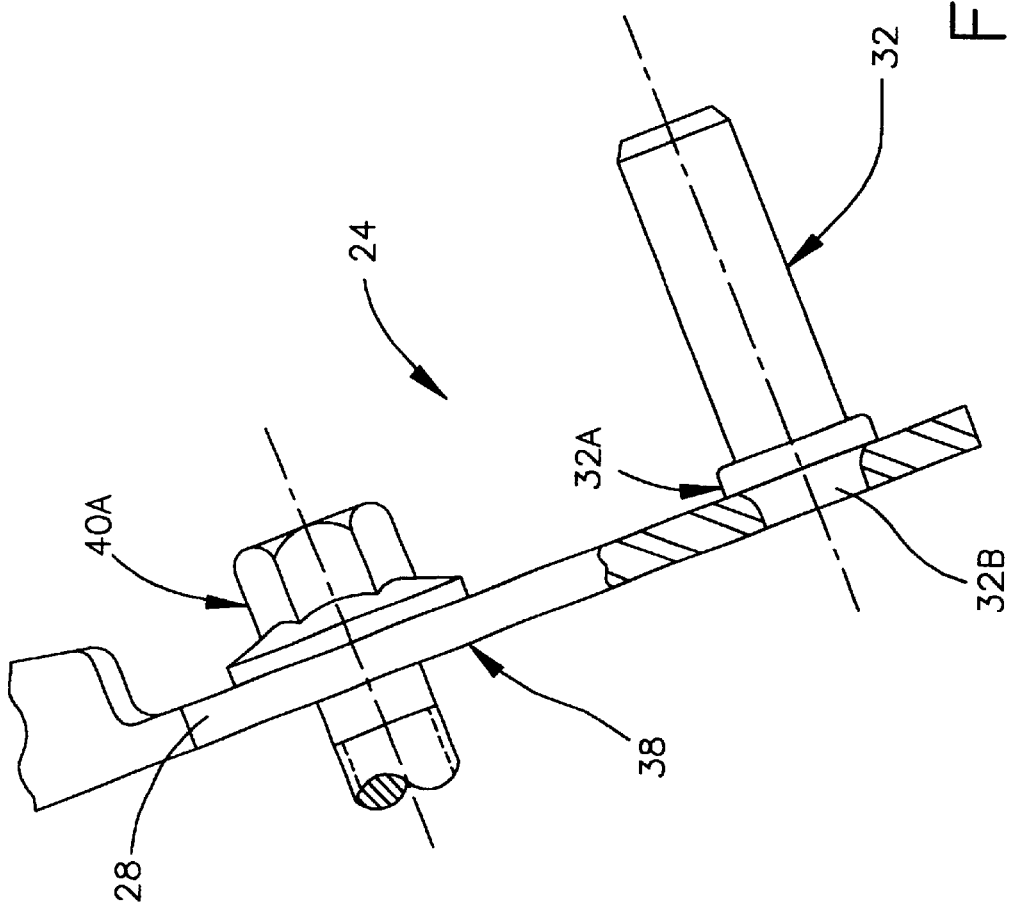
FIG. 2b is a partial sectional view of the tensioner assembly taken along the arrow 2a of FIG. 1.
Figure 2C:
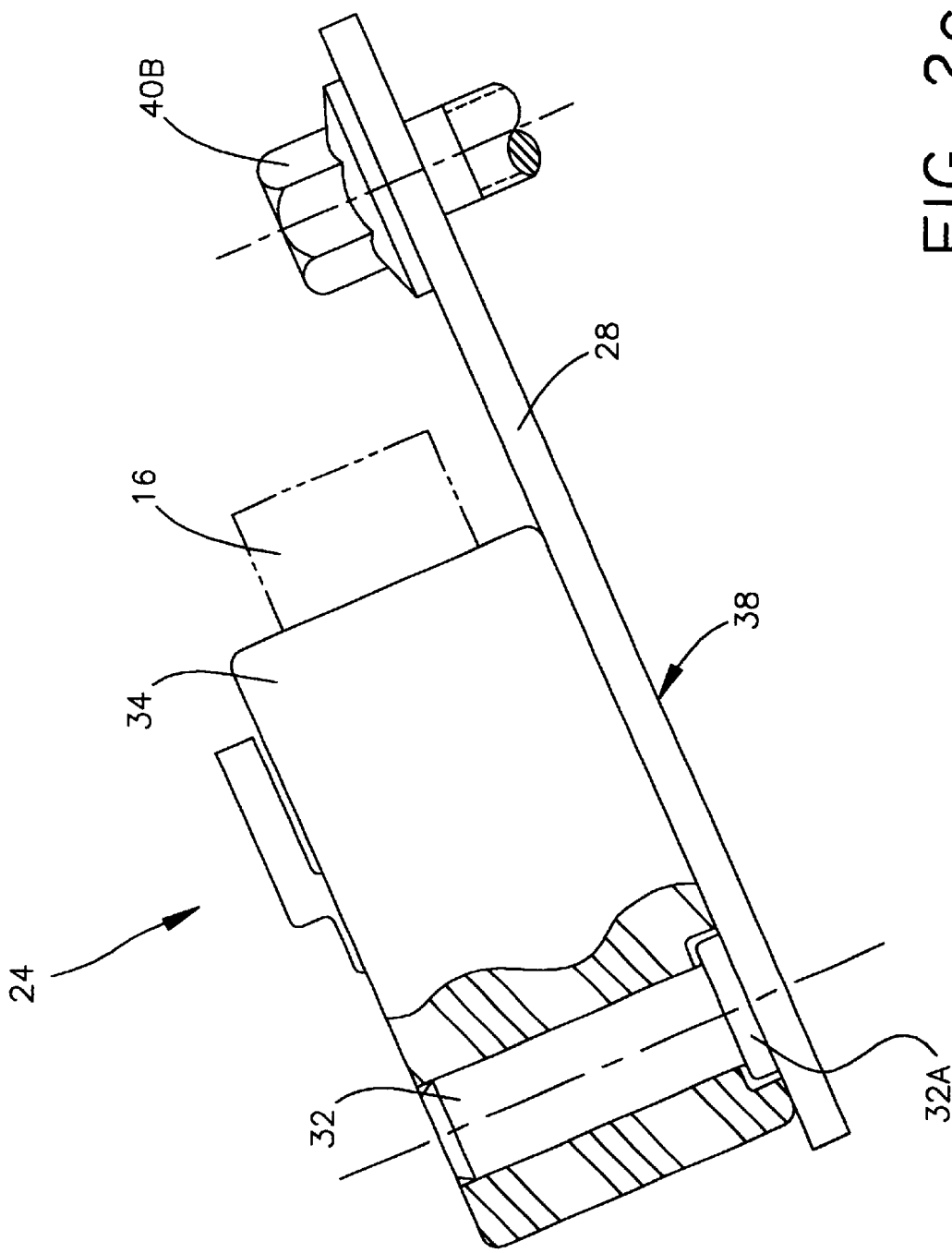
FIG. 2c is a partial sectional view of the tensioner assembly taken along the arrow 2c of FIG. 1.
Figure 3:
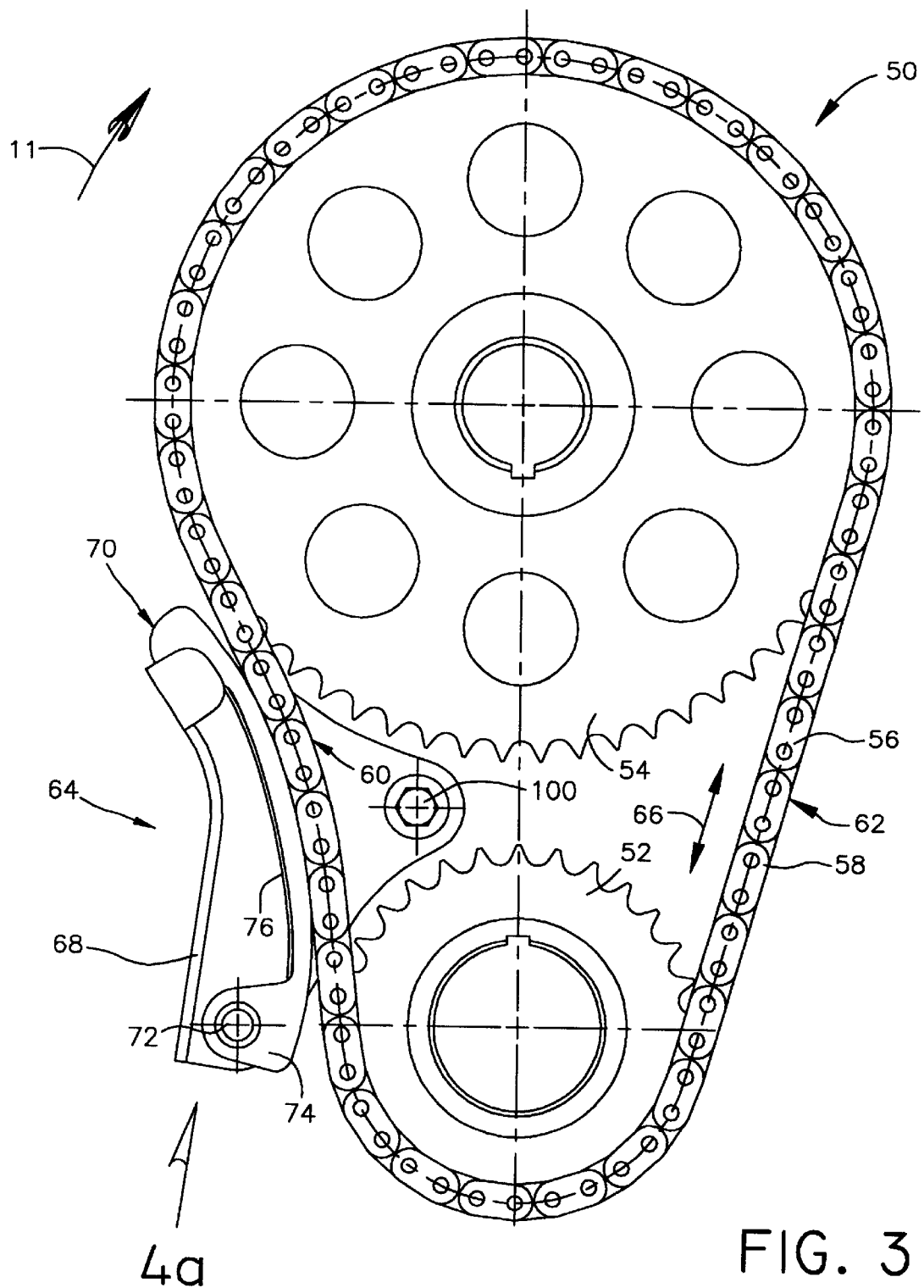
FIG. 3 is a principal view of a mechanical chain tensioner assembly having a single-fastener mounting arrangement and incorporates the features of the present invention therein.

Referring now to FIG. 3, an exemplary automotive chain drive system 50 is shown. The chain drive system 50 includes at least a drive sprocket 52, a driven sprocket 54, and a chain 56 (e.g. roller chain, inverted tooth chain, etc.) having a number of chain pitches 58. It is contemplated that the chain drive system 50 can include additional sprockets such as idler sprockets, balance shaft sprockets, etc. The chain 56 engages and wraps about sprockets 52 and 54 and has two spans extending between the sprockets, slack strand 60 and taut strand 62. A central portion of the taut strand 62 may be guided between the driven sprocket 64 and the drive sprocket 62 with a conventional chain guide (not shown).

A blade-type mechanical tensioner assembly 64 applies a tensioning force to the slack strand 60. Thus, the chain 56 is under tension as shown by arrows 66. The tensioner assembly 64 includes a bracket 68, typically a rigid metal part that may be formed by stamping, and an elongated shoe sub-assembly 70 pivotally secured to the bracket 68 by a pivot pin 72. The sub-assembly 70 includes a chain-engaging shoe member 74, typically injection molded from a plastic resin material that will "creep" under load and elevated temperature, and a blade spring 76, typically formed from spring steel, incorporated into the shoe member to provide the shoe subassembly 70 with the resiliency and rigidity that is necessary to apply the proper amount of tensioning force to the slack strand 60 of the chain 56. Suitable brackets and shoe sub-assemblies are disclosed in U.S. Pat. Nos. 5,286,234; 5,425,680; and 5,711,732 which are hereby incorporated by reference for all they disclose.

Figure 4A:
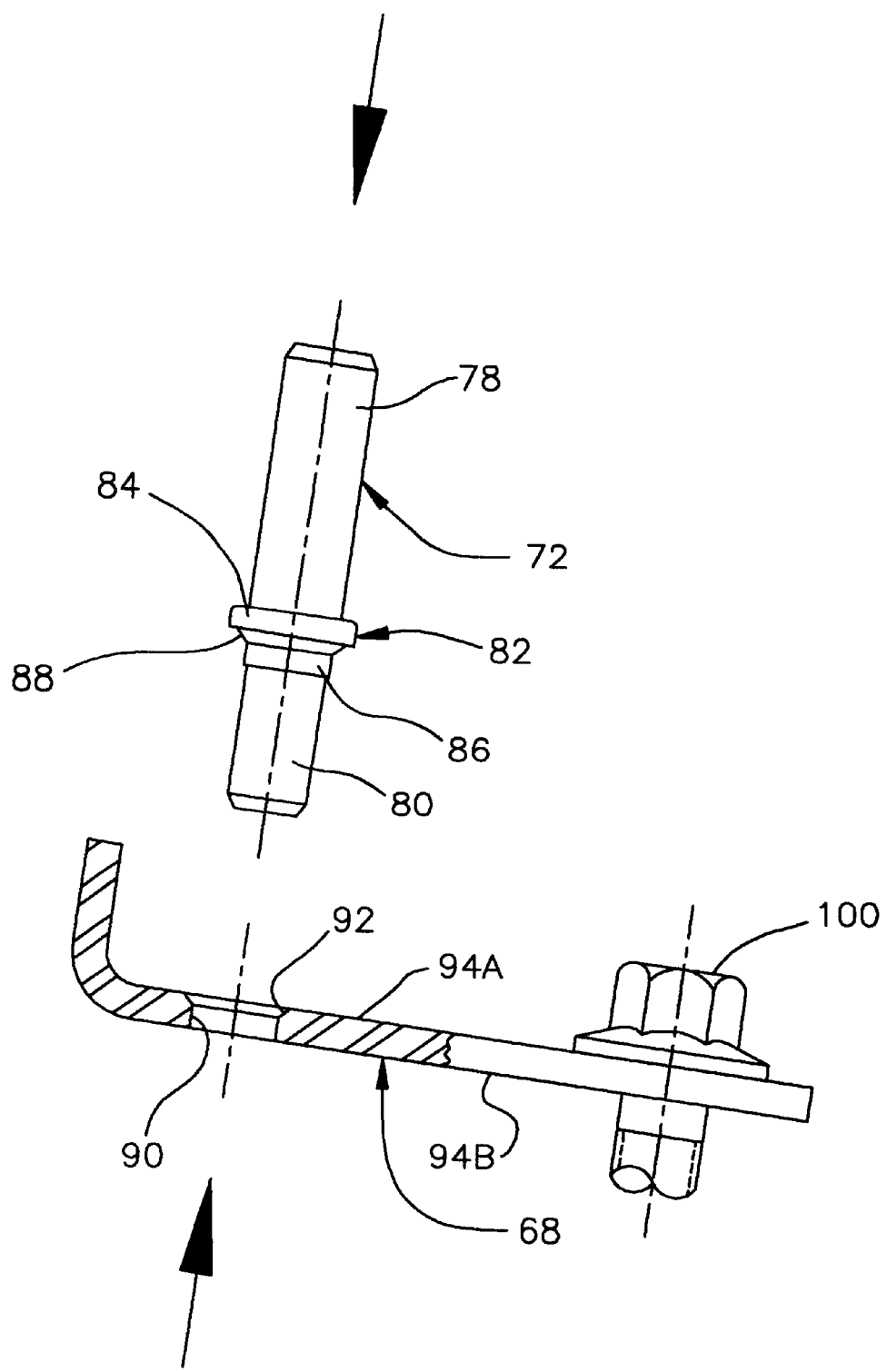
FIG. 4a is an exploded, partial sectional, view of the tensioner assembly taken along arrow 4a of FIG. 3.
Figure 4B:
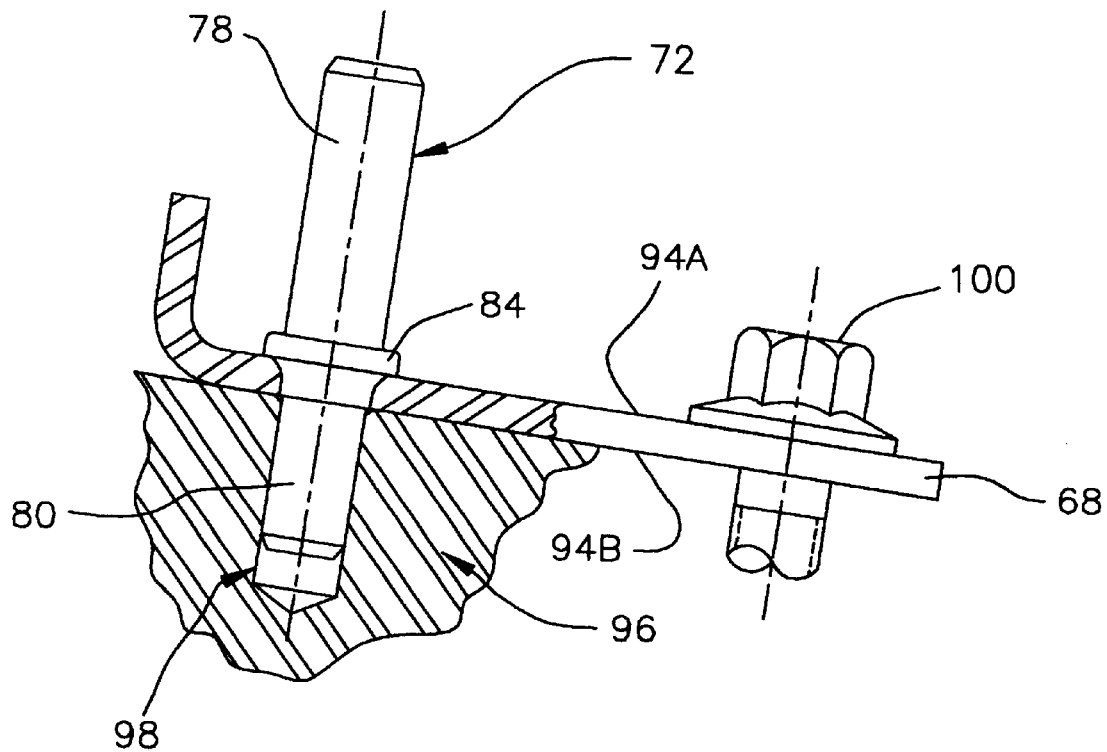
FIG. 4b is a partial sectional view of the tensioner assembly taken along the arrow 4a of FIG. 3.

As best shown in FIGS. 4a and 4b, the pivot pin 72 includes a first cylindrical portion 78, and a second cylindrical portion 80 axially spaced from the first cylindrical portion by an intermediate flanged portion 82. The flanged portion 82 includes a shoulder portion 84 proximate the first cylindrical portion 80, a shim portion 86 proximate the second cylindrical portion 80, and a tapered portion 88 extending axially between the shoulder and shim portions 84, 86. The dimensions (e.g. the diameter and length) of the first cylindrical portion 78 are sized to permit the shoe sub-assembly 70 to pivot thereabout in a conventional manner.

With continuing reference to FIGS. 4a and 4b, the bracket 68 includes an aperture 90 having a chamfered upper edge 92, which aperture 90 is shaped to mutually conform to the pivot pin shim and tapered portions 86, 88. Thus, with the pivot pin shoulder portion 84 abutting an upper surface 94A of the bracket 68, the pivot pin shim and tapered portions 86, 88 are positioned within the aperture 90. Thereafter, the pivot pin 72 can be affixed (i.e. resistance welded, press fit, swaged, etc.) to the bracket 68 in a conventional manner. With the pivot pin 72 secured to the bracket, the pivot pin first cylindrical portion 78 extends past the bracket upper surface 94A, and the pivot pin second cylindrical portion 80 extends past an bracket engine mounting surface 94B.

With the pivot pin 72 affixed to the bracket, and the shoe sub-assembly 70 pivotally secured to the first cylindrical portion 78, the tensioner subassembly 64 can be mounted to an engine component 96 such as the engine case or block, during a manufacturing or assembly procedure. As best shown in FIG. 4b, the engine component 96 (FIG. 4b) includes a bore or aperture 98. The dimensions (e.g. the diameter and length) of the bore 98 are sized to receive the pivot pin second cylindrical portion 80. More particularly, the pivot pin second cylindrical portion 80 has a diameter that is slightly smaller than the diameter of the bore 98 to provide a locational clearance fit to the bore 98.

During assembly, the pivot pin second cylindrical portion 80 performs the locating function of a fastener. With the pivot pin second cylindrical portion 80 inserted within the bore 98, a single fastener 100 can be threadably attached to a second fixing point associated with the same or a different engine component to complete the installation of the tensioner assembly to the engine component.

Thus, the pivot pin 72 functions i) to provide a reaction support and pivoting means for the shoe sub-assembly 70, and ii) to provide the locating function of a second fastener. Accordingly, the present invention finds particular application in confined spaces where packaging constraints prevent two or more bracket fasteners from being used. The pivot pin of the present invention, already an essential component of the chain tensioner assembly, beneficially provides the locating function of a second fastener, thereby making the tensioner assembly of the present invention a more cost effective part with the utilization of only one fastener. Furthermore, the installation time required to fasten the tensioner to the engine is reduced since only one fastener is used.

The invention has been described with reference to the preferred embodiment(s). Obviously, modifications and alterations will occur to others upon reading and understanding the preceding detailed description. It is intended that the invention be construed as including all such modifications and alterations insofar as they come within the scope of the appended claims or the equivalents thereof.

For instance, it is contemplated that the pivot pin arrangement of the present invention can replace one or more of a plurality of fasteners that secure a chain tensioner bracket to an engine component. For example, if three fasteners secure the bracket to the engine component, then one of the three fasteners can be replaced with the pivot pin 72 of the present invention to provide a reaction support and pivoting means for the shoe sub-assembly, and to provide the locating function of the first fastener.

Having thus described the preferred embodiment(s), the invention is now claimed to be:

1. A chain tensioner assembly comprising:

a bracket having a first surface and a second surface;

a pivot pin secured to the bracket, the pivot pin including a first portion extending from the first surface and a second portion extending from the second surface; and a shoe sub-assembly pivotally mounted to the pivot pin first portion;

the pivot pin second portion adapted to extend into a bore of an associated engine component in a mounted state of the chain tensioner assembly.

2. The chain tensioner assembly of claim 1, wherein the pivot pin second portion provides a locational clearance fit to the bore.

3. The chain tensioner assembly of claim 1, wherein the pivot pin is resistance welded to the bracket.

4. The chain tensioner assembly of claim 1, further including a single fastener adapted to secure the bracket to an associated engine component.

5. A chain drive system comprising:

a first sprocket;

a second sprocket;

a chain adapted to engage the first sprocket and the second sprocket; and a chain tensioner assembly adapted to impart a tensioning force on the chain, the chain tensioner assembly including a bracket having a first surface and a second surface, a pivot pin secured to the bracket, the pivot pin including a first portion extending from the first surface and a second portion extending from the second surface, and a shoe sub-assembly pivotally mounted to the pivot pin first portion, the pivot pin second portion adapted to extend into a bore of an associated engine component in a mounted state of the chain tensioner assembly.

6. The chain drive system of claim 5, wherein the pivot pin second portion provides a locational clearance fit to the bore.

7. The chain drive system of claim 5, wherein the pivot pin is resistance welded to the bracket.

8. The chain drive system of claim 5, further including a single fastener adapted to secure the bracket to an associated engine component.

9. A chain drive system associated with an automotive engine, the chain drive system including:

a drive sprocket rotatably mounted to the engine;

a driven sprocket rotatably mounted to the engine;

a chain engaging the drive sprocket and the driven sprocket; and a chain tensioner assembly that imparts a tensioning force on the chain, the chain tensioner assembly including a bracket having a first surface and a second surface, a pivot pin secured to the bracket, the pivot pin including a first portion extending from the first surface and a second portion extending from the second surface, and a shoe sub-assembly pivotally mounted to the pivot pin first portion, the pivot pin second portion extending into a bore associated with the engine.

10. The chain drive system of claim 9, wherein the pivot pin second portion provides a locational clearance fit to the bore.

11. The chain drive system of claim 9, wherein the pivot pin is resistance welded to the bracket.

12. The chain drive system of claim 9, further including a single fastener adapted to secure the bracket to an associated engine component.

13. A method of mounting a chain tensioner assembly to an engine component, the chain tensioner assembly including a bracket having a first surface and a second surface, a pivot pin secured to the bracket, the pivot pin including a first portion extending from the first surface and a second portion extending from the second surface, and a shoe sub-assembly pivotally mounted to the pivot pin first portion, the method comprising the steps of:

inserting the pivot pin second portion into a bore associated with an engine component; and securing the bracket to an engine component with a fastener.

14. The method of claim 13, further including the step of securing the bracket to an engine component with a plurality of fasteners.

\* \* \* \* \*